United States Patent [19]

Arakawa

[11] Patent Number: 5,439,585
[45] Date of Patent: Aug. 8, 1995

[54] OIL FILTERING DEVICE FOR MOTOR BICYCLE

[75] Inventor: Hidetoshi Arakawa, Hamamatsu, Japan

[73] Assignee: Suzuki Kabushiki Kaisha, Japan

[21] Appl. No.: 116,281

[22] Filed: Sep. 3, 1993

[30] Foreign Application Priority Data

Feb. 10, 1993 [JP] Japan .................................. 5-023018

[51] Int. Cl.$^6$ ............................................. F01M 1/10
[52] U.S. Cl. .................................. 210/168; 210/416.5; 210/453; 184/6.24; 123/196 A; 180/219
[58] Field of Search .................. 184/6.24, 6.25; 123/196 A; 180/219, 228; 210/172, 453, 454, 416.5, 168

[56] References Cited

U.S. PATENT DOCUMENTS 2,318,276  5/1943  Worthington .................. 210/168
4,497,293  2/1985  Takagi et al. .................. 123/196 A

FOREIGN PATENT DOCUMENTS 2519698  7/1983  France .
1300703  12/1972  United Kingdom .
2130653  6/1984  United Kingdom .

OTHER PUBLICATIONS

Patent Abstracts of Japan, vol. 8, No. 47 (M-280) 2 Mar. 1984.

Primary Examiner—Matthew O. Savage
Attorney, Agent, or Firm—Adams & Wilks

[57] ABSTRACT

An oil filtering device for use in a swing-type power unit of a motor bicycle having a four-stroke-cycle engine including a crank case, comprises an oil pan for storing an oil, an oil pump for conveying the oil in the oil pan to engine portions such as a crank shaft involving friction, a lubrication passage through which the oil conveyed by the oil pump is supplied to the engine portions involving friction, an oil strainer provided in the lubrication passage for first filtering the oil, and an oil filter for further filtering the oil which has been filtered by the oil strainer. The oil to be fed to the crank shaft, for example, involving friction is conveyed by way of the oil strainer and the oil filter through the lubrication passage before being supplied thereto. The oil strainer and the oil filter are arranged below and spaced apart from the crank shaft and detachably provided on a surface of the crank case composed of two halves. The swing-type power unit is provided with a suspension arm having a suspension boss to which the oil filter is provided.

9 Claims, 10 Drawing Sheets

OIL FILTERING DEVICE FOR MOTOR BICYCLE

BACKGROUND OF THE INVENTION

The present invention relates to an oil filtering device for a motor bicycle and, more specifically, to an oil filtering device for use in a swing-type power unit of a scooter having a four-stroke-cycle engine.

Figure 10:
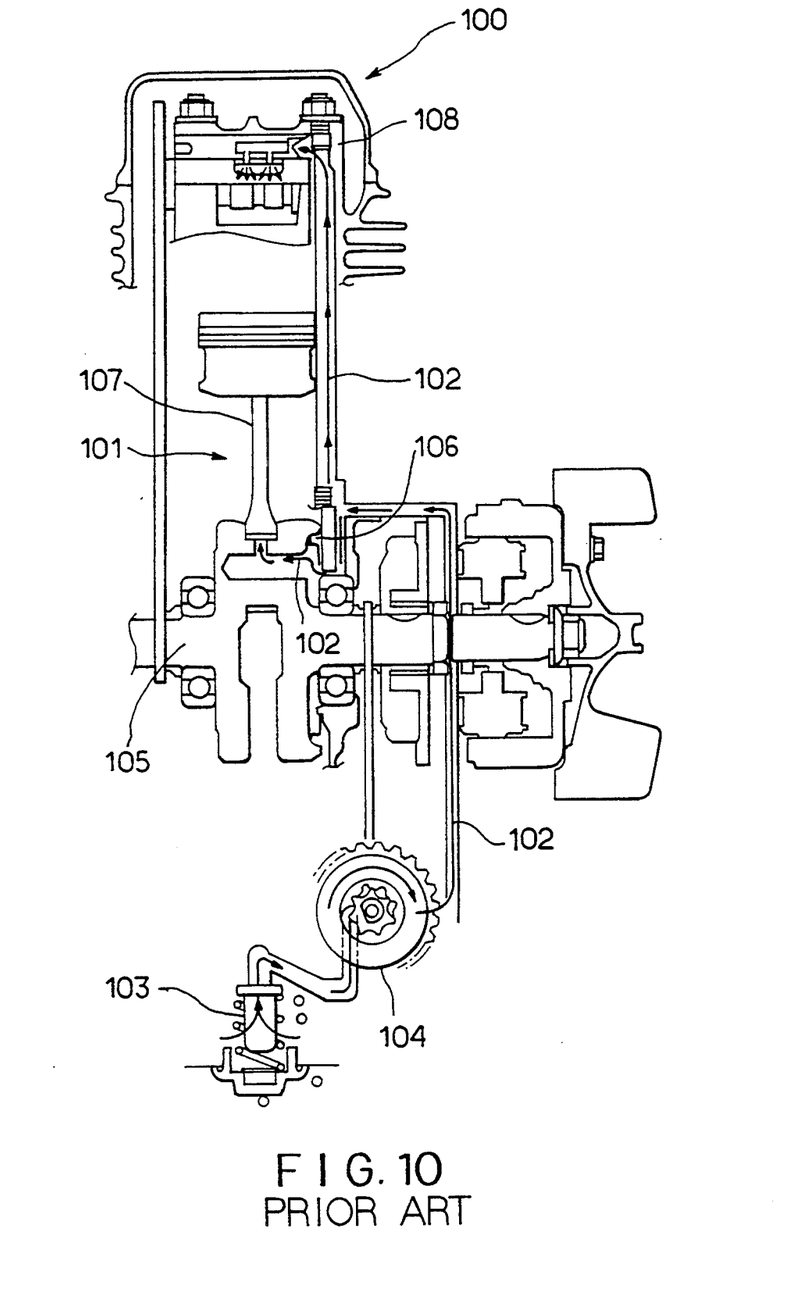
FIG. 10 is a diagram for illustrating a conventional structure of an oil filtering device for a scooter.

FIG. 10 shows an engine 100 having a conventional oil filtering device 101 for a scooter. With this oil filtering device 101, a lubricating oil 102, the flow of which is indicated by arrows in an oil pan, is conveyed to a crank shaft 105 by an oil pump 104 immediately after any relatively large particles of dirt have been filtered out therefrom by an oil strainer 103, serving as a first filtering section, provided on the lower surface of the engine 100. Thereafter, the oil is conveyed to portions of the engine 100 at which a friction occurs, for example, a connecting rod 107 and a cylinder head 108, through centrifugal oil filter 106 provided on the crank shaft 105 and serving as a second filtering section. The mounting of the oil strainer, 103, which is detachably provided on the lower surface of the engine 100, is rather troublesome. Further, since the centrifugal oil filter 106 is formed on the crank shaft 105, its mounting is also rather troublesome.

Further, the crank shaft 105, on which the centrifugal oil filter 106 is provided, is subjected to strong vibrations during travelling, so that the oil 102 supplied to the crank shaft 105 is liable to be mixed with air, which results in that the lubricating performance of the lubricating oil 102 is liable to deteriorate.

In addition, since the centrifugal oil filter 106 is situated above and spaced apart from the oil strainer 103, the load on the oil pump 104 due to the weight of dust, dirt, etc. which has not been filtered out by the oil strainer 103 is considerably large, which also is not desirable from the viewpoint of the lubricating performance of the lubricating oil 102.

SUMMARY OF THE INVENTION

An object of the present invention is to substantially eliminate defects or drawbacks encountered in the prior art and to provide an oil filtering device for a scooter capable of facilitating the replacement of the filtering sections for filtering lubricating oil, such as the strainer and improving the durability of the crank shaft by making the lubricating function of the oil less subject to deterioration.

This and other objects of the present invention can be achieved by providing an oil filtering device for use in a swing-type power unit of a motor bicycle having a four-stroke-cycle engine including a crank case, the oil filtering device comprising:

an oil pan for storing an oil;
an oil pump for conveying the oil in the oil pan to engine portions including a crank shaft which produce friction;
a lubrication passage means through which the oil conveyed by the oil pump is supplied to the engine portions involving friction;
a first filtering section provided in the lubrication passage for first filtering the oil; and
a second filtering section for further filtering the oil which has been filtered by the first filtering section, wherein the oil to be fed to the engine portions including the crank shaft is conveyed by way of the first and second filtering sections before being supplied thereto, the first and second filtering sections being arranged below and spaced apart from the crank shaft and detachably provided on a surface of the crank case.

In a preferred embodiment, the first filtering section is an oil strainer and the second filtering section is an oil filter, both the oil strainer and oil filter being arranged in the crank case. The crank case is composed of right- and left-hand case halves to either one of which the oil strainer and the oil filter are arranged. The oil strainer is disposed to the oil pan at its lowermost portion directly below the location of the crank shaft.

The swing-type power unit is provided with a suspension arm having a suspension boss to which the oil filter is provided.

The lubrication passage means comprises a first passage extending from the first filtering section, a main passage which has an upstream end connected to a downstream end of the first passage and which crosses the crank shaft substantially at a central portion thereof in grade separation and linearly extends along a longitudinal dimension of a motor bicycle body, a second passage connected to a downstream end of the main passage and extending toward the second filtering section, and a third passage extending from the second filtering section.

According to the structures and characteristics of the oil filtering device for a motor bicycle, particularly a scooter, of the present invention, the first and second filtering sections are situated below and spaced apart from the crank shaft, one of the engine portions including the crank shaft producing friction, so that they are less subject to the influence of the vibrations of the crank shaft during the travelling thereof than that in the prior art. Furthermore, since the first and second filtering sections are detachably provided on the right- or left-hand side surface of the crank case, they can be easily mounted to the scooter without requiring any special posture by the maintenance technician. In addition, due to the provision of the second filtering section in the suspension boss of the crank case, the rigidity of the second filtering section can be enhanced.

The nature and further features of the present invention will be made more clear from the following descriptions made in conjunction with the accompanying drawings.

DESCRIPTION OF THE PREFERRED EMBODIMENT

The present invention will be described hereunder in detail with reference to the accompanying drawings.

Figure 1:
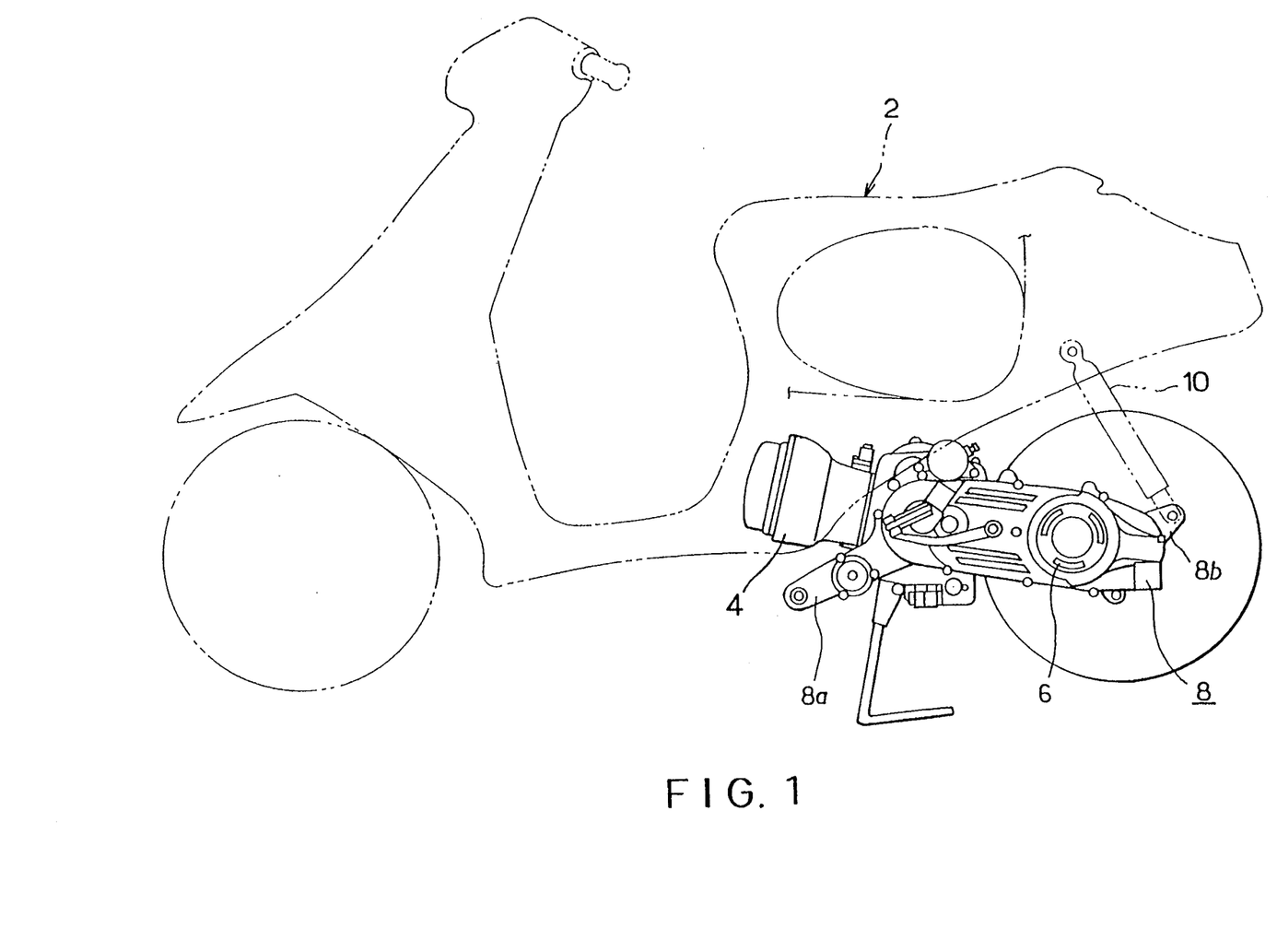
FIG. 1 is an overall side view of a scooter provided with a four-stroke-cycle engine on which a swing-type power unit using the oil filtering device of the present invention is mounted.
Figure 2:
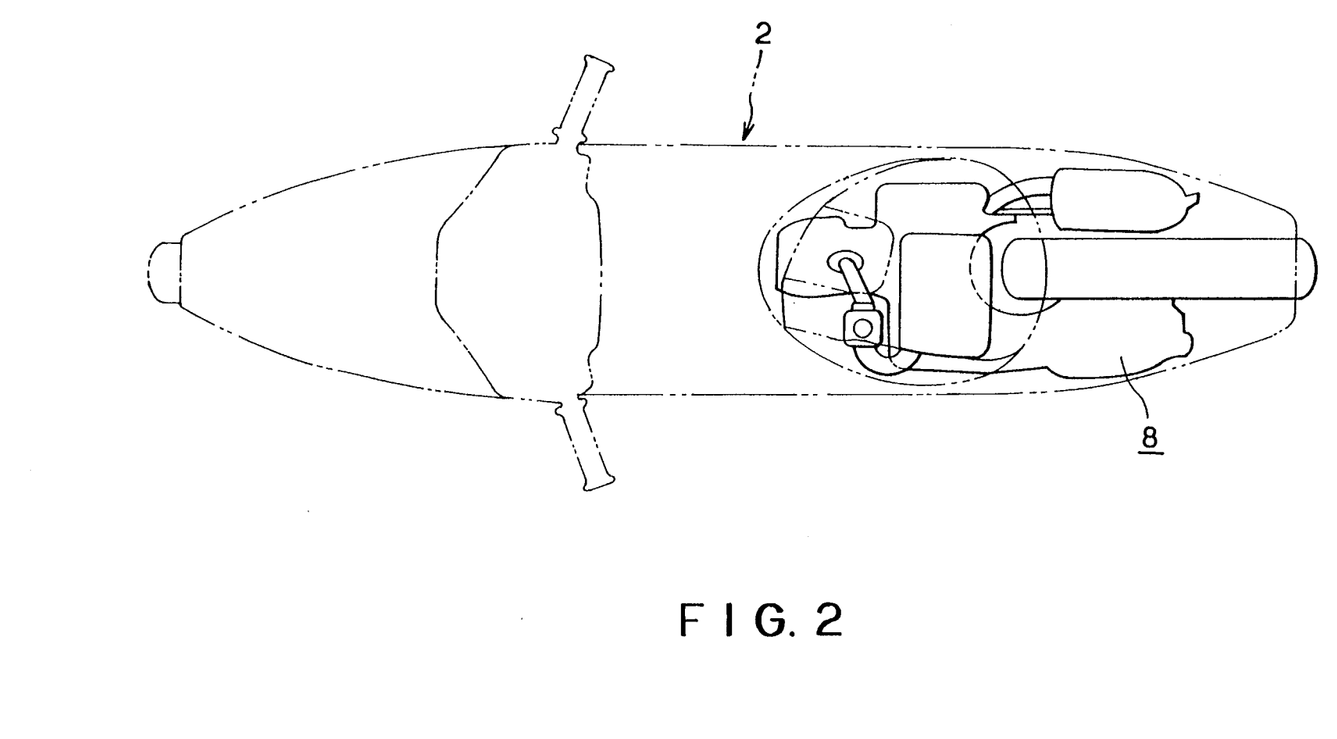
FIG. 2 is a plan view of the four-cycle-engine scooter of FIG. 1.

Referring to FIGS. 1 and 2, a scooter 2 has a swing-type power unit 8 consisting of a four-stroke-cycle engine 4 and a transmission 6, which form an integral unit.

The swing-type power unit 8 is mounted on a vehicle body frame through the intermediation of a suspension arm 8a provided in the front section thereof. Further, a rear section 8b thereof is attached to the vehicle body frame through the intermediation of a rear cushion 10. The engine 4 of the power unit 8 is provided with the oil filtering device.

As shown in FIGS. 3–9, the oil filtering device comprises an oil pan 12 for storing oil 11, an oil pump 18 for sucking the oil 11 in the oil pan 12 to feed it in a pressurized state to the portions of the engine 4 producing friction, such as a crank shaft 16 and a connecting rod, (not shown), a lubrication passage 20 for conveying the oil 11 fed by the oil pump 18 to the crank shaft 16, etc., an oil strainer 22 provided in the lubrication passage 20 and serving as a first filtering section to filter the oil 11 in the oil pan 12, and an oil filter 24 serving as a second filtering section for further filtering the oil 11 which has been filtered by the oil strainer 22, these components of the oil filtering device being contained in a crank case 26.

The crank case 26 consists of a larger case section 26a provided on a right-hand side with respect to the travelling direction of the vehicle, and a smaller case section 26b provided on a left-hand side of the same. The oil filtering device 1 is arranged in the larger case section 26a.

Figure 3:
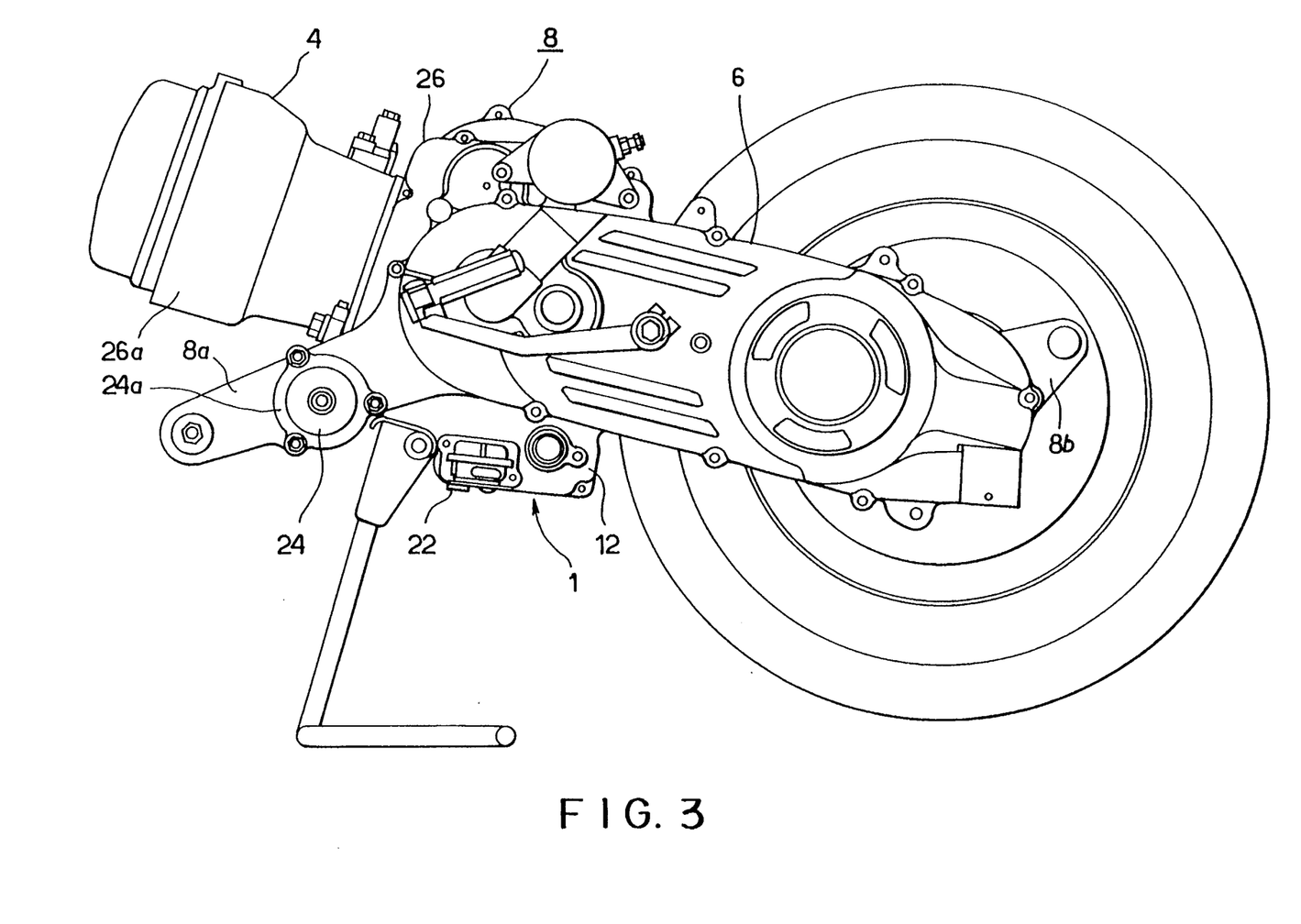
FIG. 3 is a left-hand side view of the swing-type power unit with a rear wheel attached thereto.
Figure 4:
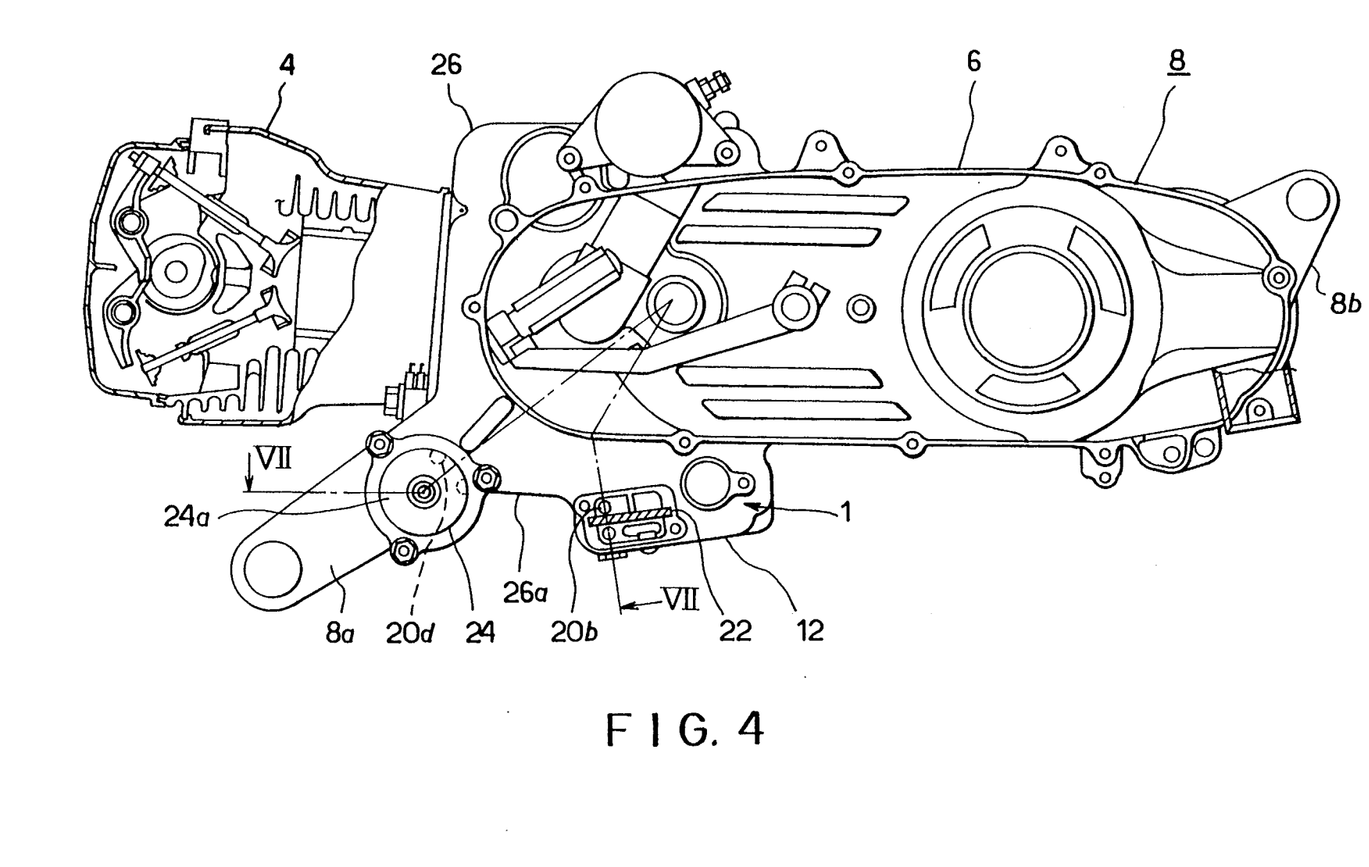
FIG. 4 is a left-hand side view of the swing-type power unit, partially cut away.
Figure 5:
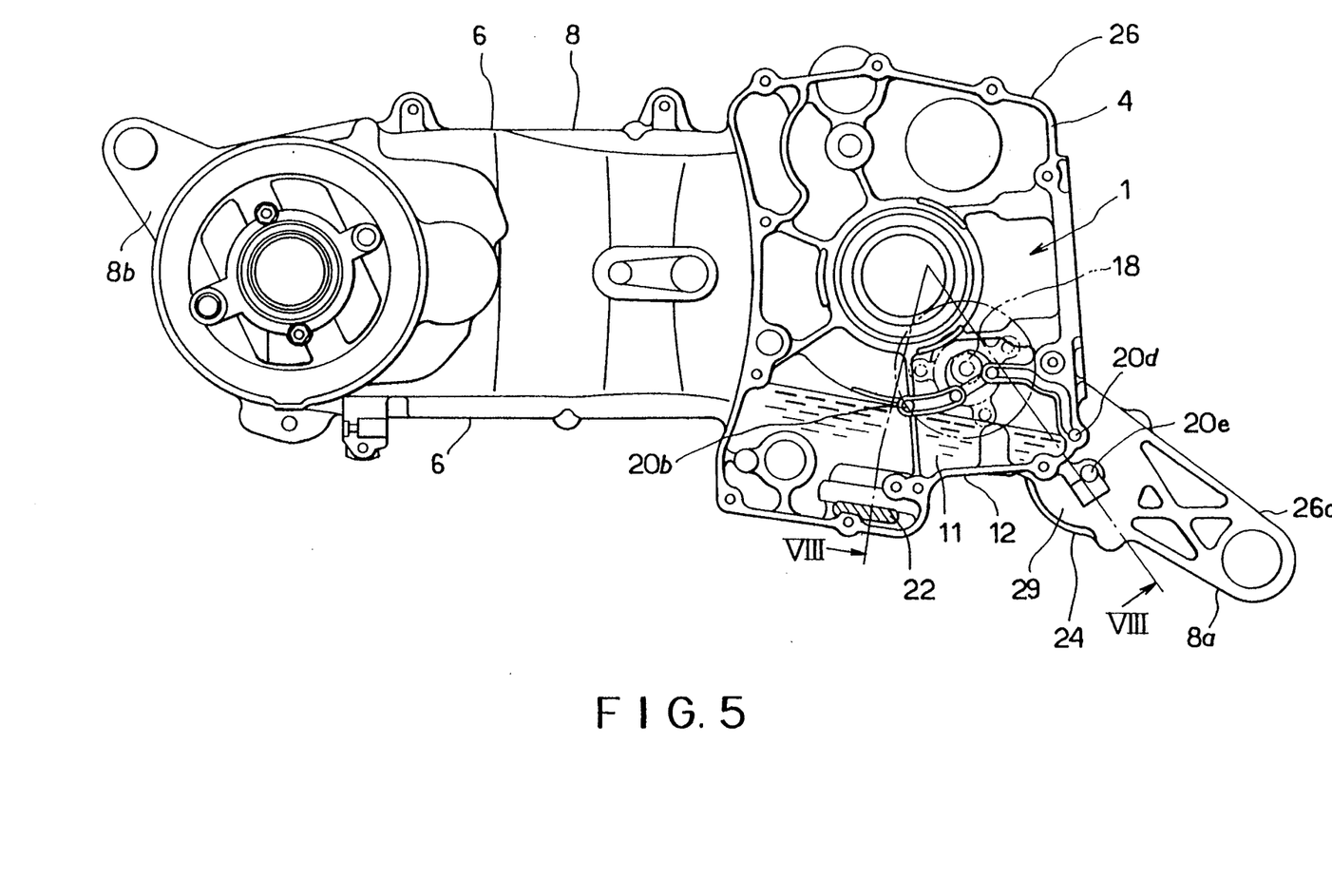
FIG. 5 is a diagram showing the swing-type power unit with a smaller case section thereof removed and its oil pan containing oil.
Figure 6:
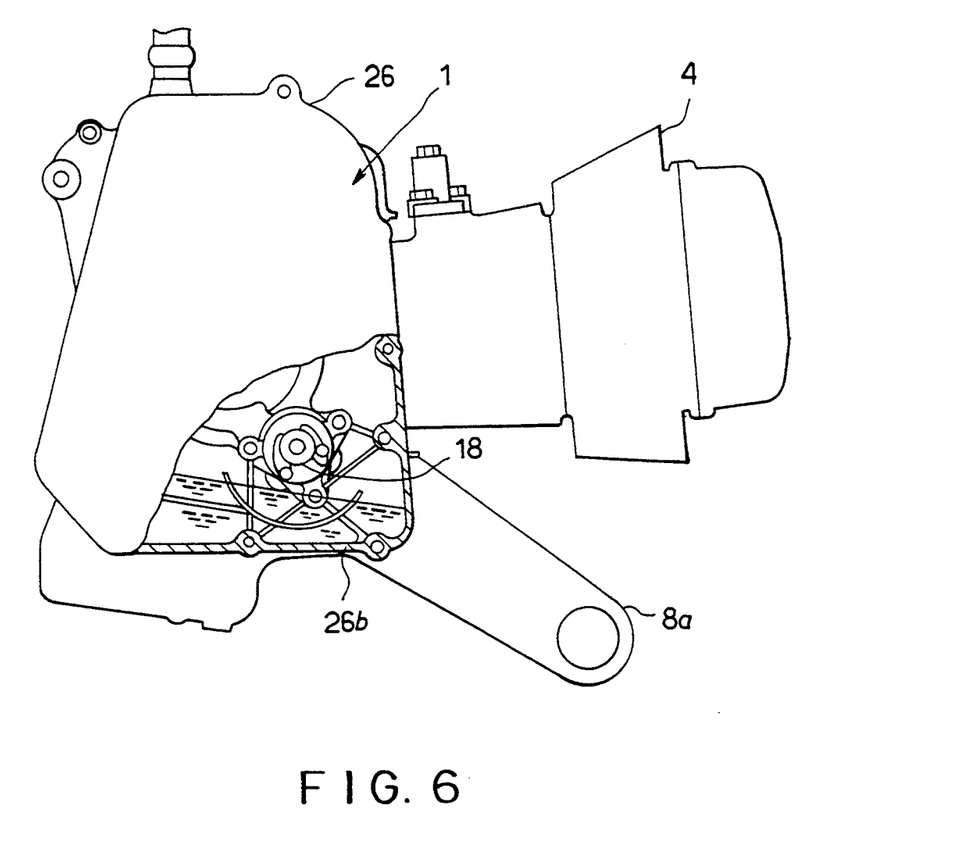
FIG. 6 is a right-hand side view of the swing-type power unit, partially cut away.

As can be seen from FIGS. 3 and 5, the oil pan 12 is provided in the lowest section of the larger case section 26a.

The crank shaft 16 is rotatably supported inside the larger case section 26a by means of ball bearings 17 and has in its interior a main gallery 20a extending in parallel with the axis thereof and constituting a part of the lubrication passage 20. The oil 11, the flow of which in the lubrication passage 20 is indicated by the arrows and which is being pressurized by the oil pump 18, is forced out of the main gallery 20a and supplied to the connecting rod, etc.

The oil pump 18 is situated at a position to the front of the oil pan 12 and at a somewhat higher level than the oil surface in the oil pan.

Figure 7:
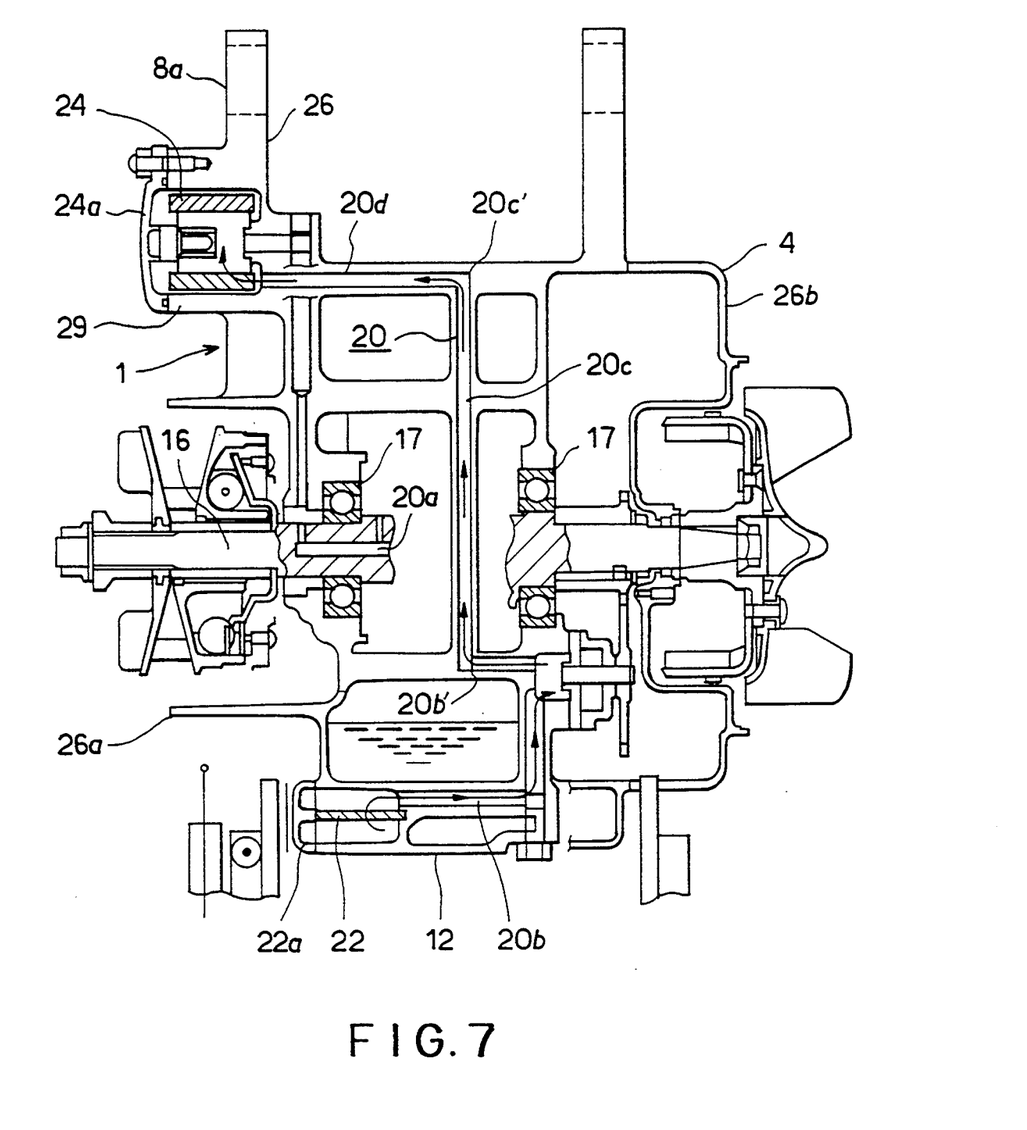
FIG. 7 is a schematic sectional view taken along line VII—VII of FIG. 4 showing the lubrication route of the lubricating oil conveyed from the oil strainer to the oil filter.

As shown in FIG. 7, for example, the lubrication passage 20 is formed in such a way that the oil 11 in the oil pan 12 is supplied to the cylinder head, etc. after being conveyed by way of the oil strainer 22 and the oil filter 24. As can be seen from FIGS. 7 and 9, the lubrication passage 20 comprises a passage 20b extending from the oil strainer 22 and having a substantially L-shaped angle configuration, a main passage 20c whose rear end is connected to the front end 20b' of the passage 20b and which crosses the crank shaft 16 substantially at the central portion thereof in grade separation and linearly extends along the longitudinal dimension of the vehicle, a passage 20d connected to the front end 20c' of the main passage 20c and extending toward the oil filter 24, and a passage 20e extending from the oil filter 24 to communicate with the main gallery 20a.

The oil strainer 22 and the oil filter 24 are arranged below and spaced apart from the crank shaft 16. More specifically, as is apparent from FIGS. 3, 5 and 8, the oil strainer 22 is adjacent to the lowest section of the oil pan 12 and situated substantially directly below and somewhat spaced apart from the crank shaft 16. Further, the oil strainer 22 communicates with the oil pan 12 through a small hole 28. The oil filter 24 is arranged in a suspension boss 29 provided substantially at the center of the suspension arm 8a. The oil strainer 22 and the oil filter 24 constitute removable filter members which are detachably provided on the right-hand side surface 26a of the crank case 26. It is also possible for them to be provided in a similar fashion on the left-hand side surface 26b of the crank case 26.

Figure 8:
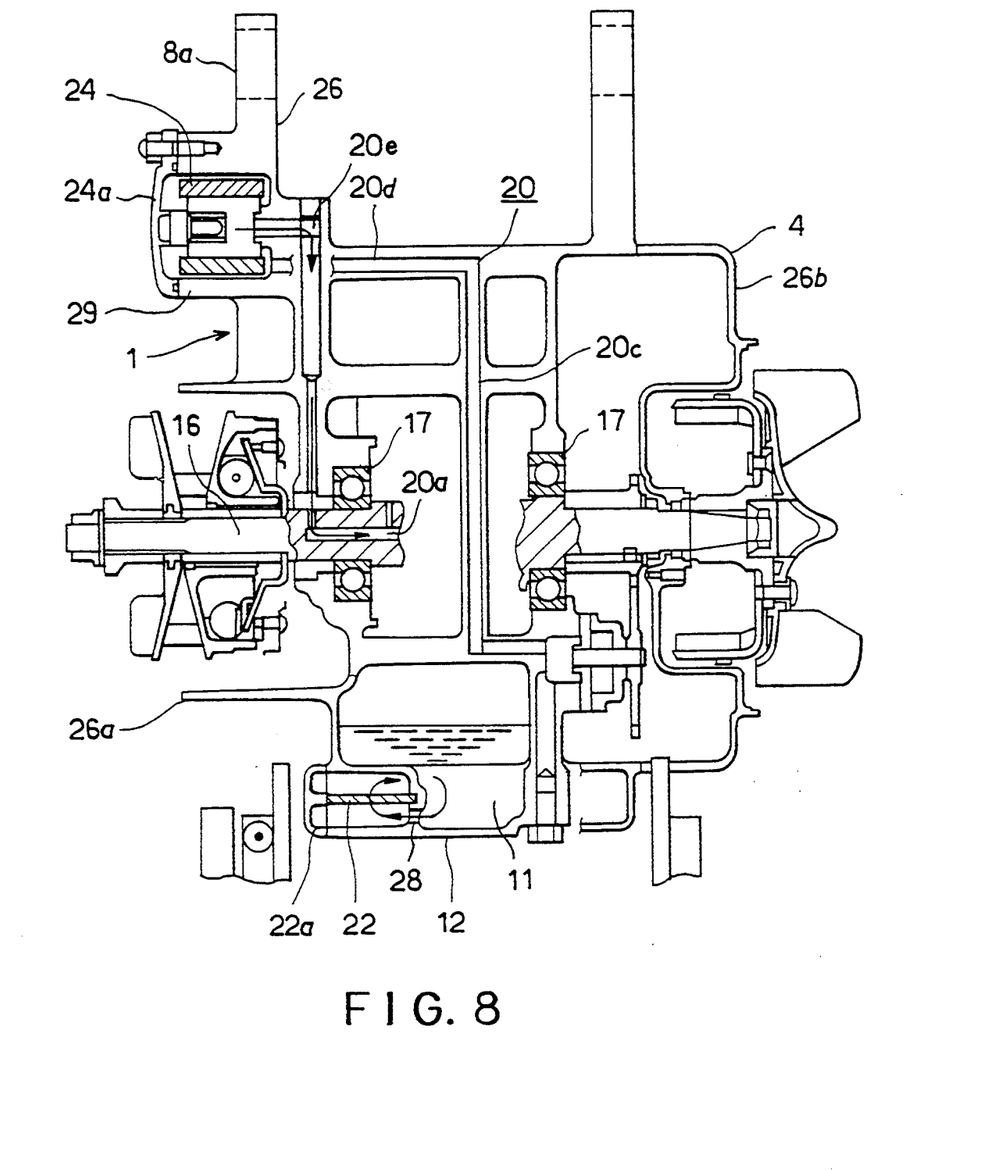
FIG. 8 is a schematic sectional view taken along lines VIII—VIII of FIG. 5, showing the lubrication route of the lubricating oil conveyed from the oil filter to the crank shaft.
Figure 9:
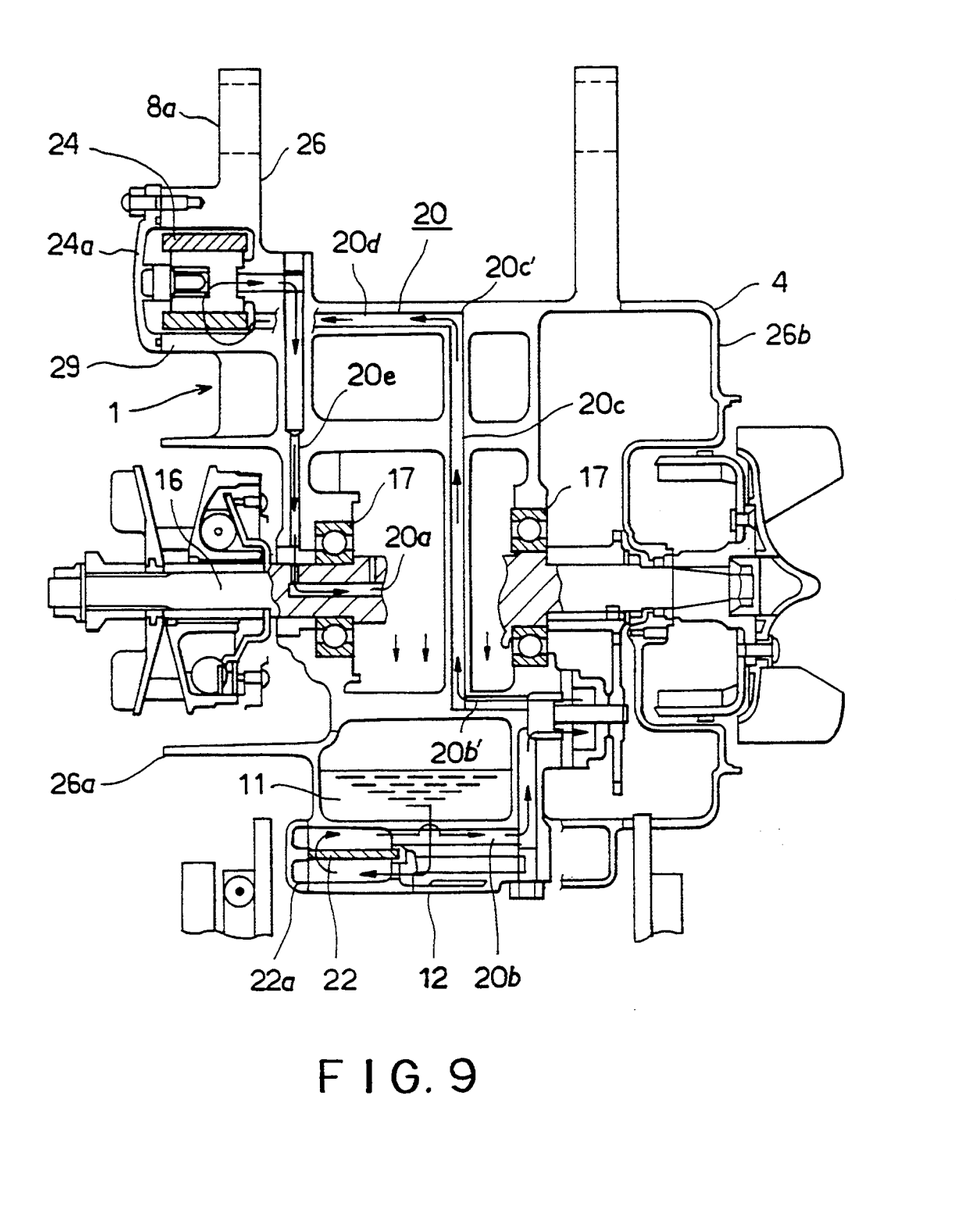
FIG. 9 is a schematic diagram showing the lubrication route of the lubricating oil conveyed from the oil strainer to the crankshaft by way of the oil filter.

The oil strainer 22 and the oil filter 24 are provided with covers 22a and 24a, respectively, through which they can be detachably or removably mounted to the crank case 26. as shown in FIG. 8, the covers 22a and 24a are detachable or removable in the left-hand or sidewise direction of the vehicle, which allows for easy maintenance.

The operation and effects of the oil filtering device 1 for a scooter of the present invention, constructed as described above, will be described hereunder.

When the oil 11 in the oil pan 12, communicating with the oil strainer through the small hole 28, is sucked by the oil pump 18, any relatively large particles of dirt are first filtered out by the oil strainer 22. Then, the oil is fed to the oil filter 24 by way of the passage 20b, the main passage 20c and the passage 20d. The oil filter 24 filters out any fine particles of dust, etc. which have not been filtered out by the oil strainer 22. Thereafter, the oil enters the main gallery 20a by way of the passage 20e, and is then supplied to the engine portions which generate friction through an oil hole of the crank shaft 16.

According to the oil filtering device 1 for a scooter, since the oil fed to the engine portions producing friction, including the crank shaft 16, is supplied thereto after being conveyed by way of the oil strainer 22 and the oil filter 24, the oil can be made clean through duplicated filtering process.

Furthermore, since the oil strainer 22 and the oil filter 24 are arranged below and spaced apart from the crank shaft 16, they are less subject to the vibrations of the crank shaft 16 during its travelling, so that the lubricating function of the oil is less subject to deterioration, whereby an improvement can be attained in terms of the durability of the crank shaft.

In addition, since the oil strainer 22 and the oil filter 24 are detachably provided on the right-hand side surface 26a or the left-hand side surface 26b of the crank case 26, they can be easily mounted to the scooter 2 without requiring any special posture by the maintenance technician. Thus, the replacement of the filtering sections for filtering the oil 11, including the oil strainer 22, can be facilitated.

Furthermore, since the second filtering section is provided in the suspension boss of the crank case, the rigidity of the second filtering section is enhanced, thereby making the device less subject to trouble.

What is claimed is:

1. In a motor bicycle having a longitudinal axis and a pair of wheels spaced apart along said longitudinal axis, and an engine for driving one of said wheels, said engine having a crank shaft and a crank case, said crank shaft having a transverse axis of rotation extending generally parallel to an axis of rotation of the driven one of said wheels and generally perpendicularly to said longitudinal axis, said engine having a pair of opposed sides spaced apart in the direction of said transverse axis and extending transversely of said transverse axis, and an oil filtering system, the improvement comprising: oil pumping means for pumping oil from a base of the crank case through a lubrication passage to parts of the engine; first filtering means located on one of said opposed sides of the crank case and disposed upstream of the pumping means in the lubrication passage for filtering the oil, the first filtering means having a first filter member insertable into and withdrawable out of the first filtering means; and second filtering means located on the said one of said opposed sides of the crank case and disposed in the lubrication passage downstream of the pumping means and the first filtering means for further filtering the oil filtered by the first filtering means before delivery thereof to the parts of the engine, the second filtering means having a second filter member insertable into and withdrawable out of the second filtering means.

2. A motor bicycle according to claim 1; wherein the first filter member comprises an oil strainer.

3. A motor bicycle according to claim 2; wherein the oil strainer, when inserted in the first filtering means, is located between the base of said crank case and said axis of rotation of the crank shaft.

4. A motor bicycle according to claim 2; wherein the second filter member comprises an oil filter.

5. A motor bicycle according to claim 1; wherein the second filter member comprises an oil filter.

6. A motor bicycle according to claim 1; wherein the first and second filtering means have removable covers to enable access to the first and second filter members.

7. A motor bicycle according to claim 1; further including a body frame and a suspension arm mounted on the body frame, the second filtering means being provided on the suspension arm.

8. A motor bicycle according to claim 7; wherein the suspension arm has a boss which carries the second filtering means.

9. A motor bicycle according to claim 1; wherein the first and second filter members are insertable into and withdrawable out of the first and second filtering means, respectively, in directions generally parallel to said transverse axis.

* * * * *